US00RE43063E

(19) United States
(12) Reissued Patent
Kim

(10) Patent Number: US RE43,063 E
(45) Date of Reissued Patent: Jan. 3, 2012

(54) INTEGRATED CAP ASSEMBLY OF A SECONDARY BATTERY AND FABRICATING METHOD THEREOF

(75) Inventor: Young Taek Kim, Yongin-si (KR)

(73) Assignee: Samsung SDI Co., Ltd., Yongin-si (KR)

(21) Appl. No.: 12/944,713

(22) Filed: Nov. 11, 2010

Related U.S. Patent Documents

Reissue of:

(64) Patent No.: 7,727,668
Issued: Jun. 1, 2010
Appl. No.: 11/227,957
PCT Filed: Sep. 14, 2005

U.S. Applications:

(63) Continuation of application No. 10/966,905, filed on Oct. 14, 2004, now Pat. No. 7,378,187.

(30) Foreign Application Priority Data

Oct. 15, 2003 (KR) ..... 2003-0071948

(51) Int. Cl.
*H01M 2/08* (2006.01)

(52) U.S. Cl. ..... 429/185; 429/174; 429/53; 429/62

(58) Field of Classification Search ..... 429/185, 429/174, 53, 62, 186, 180; 220/366.1, 367.1; 277/628, 641
See application file for complete search history.

(56) References Cited

U.S. PATENT DOCUMENTS

| | | | | |
|---|---|---|---|---|
| 5,912,089 | A * | 6/1999 | Kitano et al. | 429/53 |
| 6,777,128 | B2 | 8/2004 | Kim | |
| 7,378,187 | B2 | 5/2008 | Kim | |
| 2002/0122974 | A1* | 9/2002 | Kim | 429/54 |
| 2003/0194601 | A1* | 10/2003 | Lei | 429/61 |

FOREIGN PATENT DOCUMENTS

| | | |
|---|---|---|
| CN | 1374711 | 10/2002 |
| CN | 1374711 A | 10/2002 |
| KR | 10-2002-0071179 | 9/2002 |
| KR | 2002-0071179 | 9/2002 |

OTHER PUBLICATIONS

English translation of Chinese Office action dated Dec. 8, 2006, for CN 2004100836749, 2 pages.
Korean Patent Abstract for Korea Publication No. 1020020071179 A, dated Sep. 9, 2002.

* cited by examiner

*Primary Examiner* — Raymond Alejandro
(74) *Attorney, Agent, or Firm* — Christie, Parker & Hale, LLP

(57) ABSTRACT

An integrated cap assembly of a secondary battery. A cap lamination forms a top portion of the secondary battery and serves as a connection terminal while the secondary battery is charged or discharged. A gasket is molded integrally with the cap lamination in such a manner that a peripheral portion of the cap lamination is inserted in the gasket, the gasket insulating the cap lamination from a can of the secondary battery and sealing a gap between the cap lamination and the can.

20 Claims, 5 Drawing Sheets

INTEGRATED CAP ASSEMBLY OF A SECONDARY BATTERY AND FABRICATING METHOD THEREOF

Matter enclosed in heavy brackets [ ] appears in the original patent but forms no part of this reissue specification; matter printed in italics indicates the additions made by reissue.

CROSS REFERENCE TO RELATED APPLICATION

This is a continuation-in-part application of application Ser. No. 10/966,905, now U.S. Pat. No. 7,378,187, issued May 27, 2008 and filed Oct. 14, 2004, which claims priority to and the benefit of Korea Patent Application No. 10-2003-0071948 filed on Oct. 15, 2003 in the Korean Intellectual Property Office, the entire content of both of which is incorporated herein by reference.

BACKGROUND OF THE INVENTION

1. Field of the Invention

The present invention relates to a secondary battery, and more particularly, to a structure of a cap assembly forming a top of a secondary battery and a method of fabricating the same.

2. Description of the Related Art

As is generally known in the art, secondary batteries are rechargeable and can be fabricated in a smaller size with a larger capacity than primary batteries. Secondary batteries may be classified into nickel-hydrogen (Ni-MH) batteries, lithium (Li) batteries, lithium ion (Li-ion) batteries, and polymer lithium (PLI) batteries according to the materials of the secondary batteries, or into cylinder type batteries and square type batteries according to their appearances.

According to a typical method of fabricating a secondary battery, an electrode assembly including a positive electrode plate, a negative electrode plate and a separator is seated in a can generally made from aluminum or an aluminum alloy. Electrolyte is injected into the can, and the can assembly is then sealed. Each can has an electrode terminal which is formed at an upper portion of the can and is insulated from the can. The electrode terminal has a positive or negative polarity determining a polarity of the can. In addition, each can includes a positive temperature coefficient (PTC) element, a thermal fuse, and a protection circuit module (PCM).

The secondary battery employs an electrode structure in a "jelly-roll" configuration formed by winding a positive electrode plate, a negative electrode plate, and a separator interposed between the positive electrode plate and the negative electrode plate, together. The shape of the battery determines the shape of the jelly-roll employed by the battery. That is, a cylinder type battery employs a jelly-roll wound in a cylindrical shape, and a square type battery employs a jelly-roll wound in a polygonal shape having angular corners and flat sides.

FIG. 1 is a sectional view of a conventional secondary battery having a typical construction. As shown in FIG. 1, a cylinder type secondary battery includes electrode assembly 110 for generating potential difference, cylinder-type can 120 for receiving electrode assembly 110, cap assembly 130 assembled with a top of cylinder-type can 120, so as to prevent electrode assembly 110 from being separated from cylinder-type can 120, and electrolyte 140 injected in cylinder-type can 120, so as to enable movement of ions between electrodes of electrode assembly 110. Cap assembly 130 has various safety devices provided at cap assembly 130.

Cylinder-type can 120 has clamp portion 121 bent inward so as to push cap assembly 130 inward and a bead portion 122 depressed inward so as to push cap assembly 130 upward.

Cap assembly 130 includes conductive safety vent unit 131, printed circuit board 132, PTC element 133, and positive electrode cap 134. Conductive safety vent unit 131 has a bottom welded to a positive electrode lead 111 and has a convex portion which is inverted when the battery is excessively charged or abnormally heated. Printed circuit board 132 is disposed above and is electrically and mechanically connected to conductive safety vent unit 131. Printed circuit board 132 has a circuit which is cut off when the convex portion of conductive safety vent unit 131 is inverted. PTC element 133 is disposed above and is electrically and mechanically connected to printed circuit board 132. PTC element 133 is electrically cut off when heated exceeding a predetermined temperature. Positive electrode cap 134 is disposed above and is electrically and mechanically connected to PTC element 133. Positive electrode cap 134 allows current to flow to the exterior. Insulating gasket 135 surrounds circumferential portions of conductive safety vent unit 131, current breaker 132, PTC element 133, and positive electrode cap 134, stacked on each other, and insulates them from cylinder-type can 120.

However, in cap assembly 130 of the conventional cylinder-type secondary battery, conductive safety vent unit 131, printed circuit board 132, PTC element 133, and positive electrode cap 134 are simply stacked on each other, and central portion 135a, lower dip portion 135b, and upper dip portion 135c of insulating gasket 135 are simply in contact with the circumferential portion of cap assembly 130 including conductive safety vent unit 131, printed circuit board 132, PTC element 133 and positive electrode cap 134, stacked on each other. Therefore, insulating gasket 135 cannot sufficiently seal the gap between the interior and the exterior of the can and may allow internal gas of the can to leak through a nip between cap assembly 130 and insulating gasket 135 when the internal pressure has excessively increased.

SUMMARY OF THE INVENTION

In accordance with the present invention an integrated cap assembly of a secondary battery and a method of fabricating the same is provided wherein the cap assembly includes a cap lamination and an insulating gasket surrounding and clamping the cap lamination with an increased tightness, the cap lamination may include a conductive safety vent unit, a printed circuit board, a PTC element, and a positive electrode cap, the safety vent unit may include a safety vent, contact plate connected to an electrode lead of electrode assembly in the secondary battery and an insulating plate which makes the safety vent and the contact plate meet only at an electric connection portion.

Also in accordance with the present invention an integrated cap assembly of a secondary battery and a method of fabricating the same is provided which can simplify the process of fabricating the secondary battery, thereby increasing the productivity and reducing the manufacturing cost Further in accordance with the present invention an integrated cap assembly of a secondary battery is provided which includes a cap lamination and a gasket integrated with each other through injection-molding in a state that a peripheral portion of the cap lamination is inserted in the gasket, wherein the cap lamination may include a conductive safety vent unit, a printed circuit board, a PTC element, and a positive electrode cap. In an exemplary embodiment a groove and/or a hole is formed at a portion of at least one element of the cap lamination being inserted in the inner side of an insulating gasket, the portion may be a peripheral portion of a lowermost element of the cap lamination, so that a portion of the insulating gasket is inserted in the hole or the groove, thereby enhancing the assembling force between the cap lamination and the insulating gasket.

DETAILED DESCRIPTION

Figure 1:
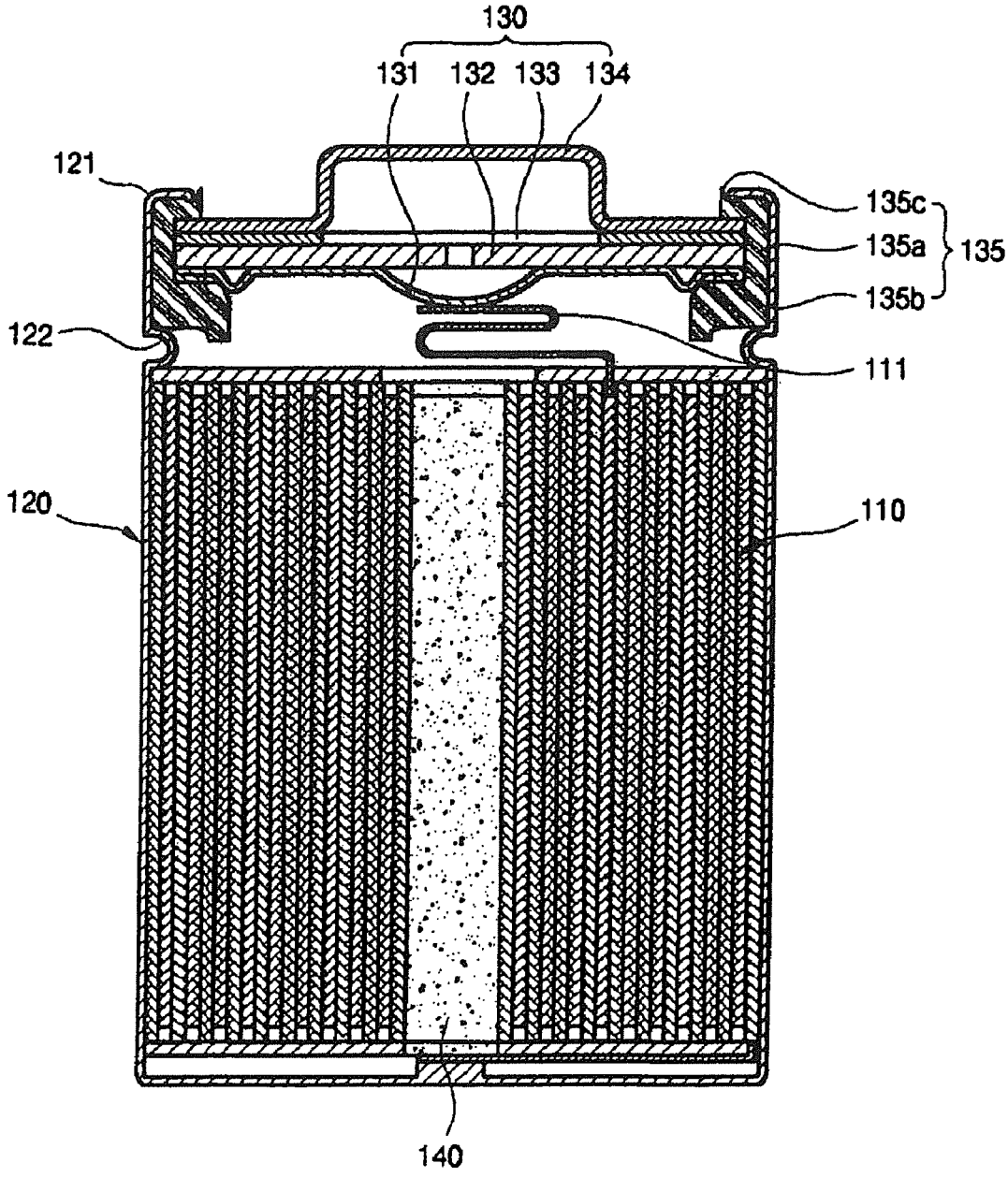
FIG.1(PRIOR ART)
FIG. 1 is a sectional view of a conventional cylinder-type secondary battery.
Figure 2:
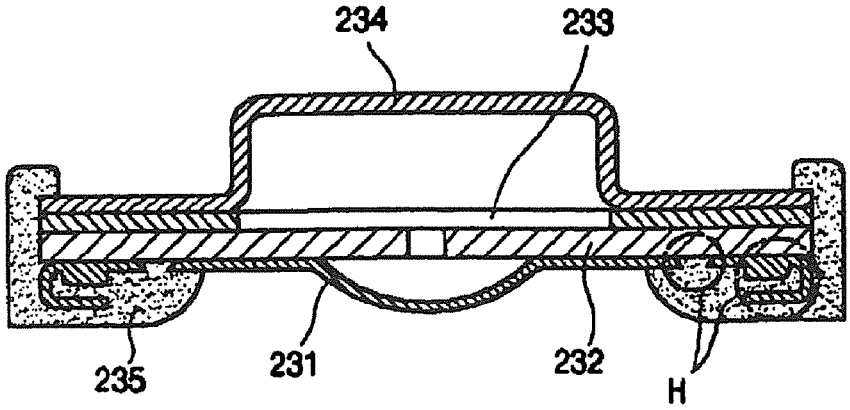
FIG. 2 is a sectional view of a cap assembly according to an exemplary embodiment of the present invention.

Referring now to FIG. 2, an exemplary embodiment of a cap assembly according to the present invention includes a cap lamination and insulating gasket 235. The cap lamination includes conductive safety vent unit 231, printed circuit board 232, PTC element 233, and positive electrode cap 234.

Conductive safety vent unit 231 seals a can of the secondary battery and can be bent outward (upward in the drawing) by a pressure generated in the secondary battery. Conductive safety vent unit 231 has a central portion which is deformed or convex inward (downward in the drawing) in a normal state. The downward convex or deformed portion of conductive safety vent unit 231 is electrically connected with a positive electrode tab extending from a positive electrode plate of an electrode assembly placed in the can of the secondary battery.

Printed circuit board/current breaker 232 is disposed above conductive safety vent unit 231 and transfers electric current supplied from the positive electrode tab to positive electrode cap 234. Printed circuit board/current breaker 232 has a current-interrupting means which is broken and interrupts electric current flow by the deformation of conductive safety vent unit 231 when the internal pressure of the battery exceeds a predetermined value due to abnormal operation such as excessive charging, etc. Printed circuit board/current breaker 232 is usually made from an epoxy-based resin. Printed circuit board/current breaker 232 includes a traverse extending over and across the deformed portion of conductive safety vent unit 231 and its ring-shaped member connected to opposite ends of the traverse. The traverse has a breakable portion which can be tom by the force applied by the deformed portion of conductive safety vent unit 231 when the deformed portion of conductive safety vent unit 231 is inverted. The breakable portion is a weakened portion having slits formed through central and end portions of the traverse. The breakable portion may have either a single kind of at least two slits, or combination of slits and grooves.

PTC element 233 is a current regulator which instantly increases the resistance to regulate or interrupt current flow when the temperature of the battery increases beyond a safety limit. PTC element 233 is optional in a cap assembly of a secondary battery according to the present invention.

Positive electrode cap 234 has a plurality of pores. Positive electrode cap 234 is an element which may come into contact with an external terminal.

The cap lamination including the elements as described above is assembled with insulating gasket 235. In order to assemble the cap lamination with insulating gasket 235, the cap lamination is inserted in and is integrally formed with insulating gasket 235 when insulating gasket 235 is molded. Then, a portion of the edges of the cap lamination is inserted into insulating gasket 235. Edges of each element of the cap lamination integrally molded in insulating gasket 235, i.e., each of conductive safety vent unit 231, Printed circuit board/current breaker 232, PTC element 233, and positive electrode cap 234, are individually integrated with insulating gasket 235. Therefore, the cap lamination and insulating gasket 235 are completely integrated with each other without any gap between them. Here, when some elements such as PTC element 233 are omitted in the cap lamination, only the other elements of the cap lamination are stacked on each other and then inserted in insulating gasket 235 while insulating gasket 235 is molded.

Further, groove H, which in exemplary embodiments may be an annular through-hole or a recess, is formed at a peripheral portion of Printed circuit board/current breaker 232, which is the lowermost element of the cap lamination. As a result, when insulating gasket 235 is molded, a portion of insulating gasket 235 is inserted in groove H, thereby enhancing the assembling force between the cap lamination and insulating gasket 235. In one exemplary embodiment, groove H is wedge shaped having an upper or rear portion wider than a lower or inlet portion thereof. Here, groove H may have not only a frusto-conical shape but also various shapes including shapes of polygonal prisms, such as triangular prisms, rectangular prisms, pentagonal prisms, etc. Further, although FIG. 2 shows groove H formed at the lowermost element of the cap lamination, a groove, hole or recess may be formed in and/or through the lower two elements or all the elements of the cap lamination.

FIG. 3 to FIG. 6 are sectional views of a cylinder-type cap assembly according to other exemplary embodiments of the present invention.

Figure 3:
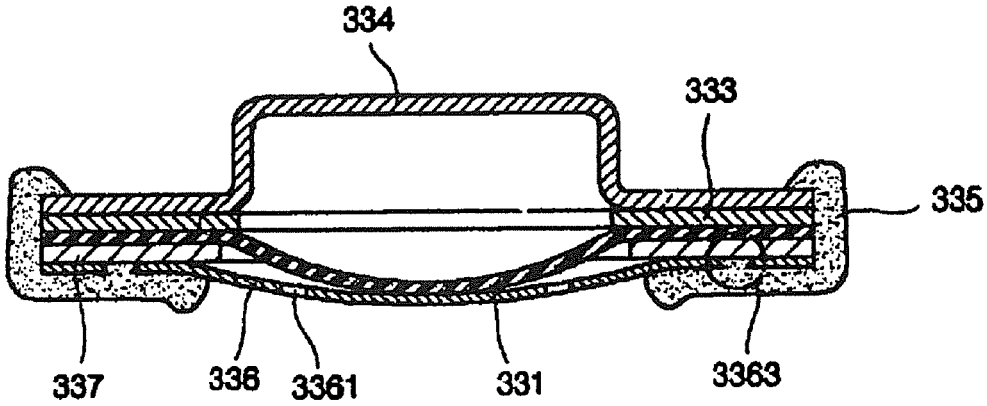
FIG. 3 is a sectional view of a cap assembly according to another embodiment of the invention.

FIG. 3 shows a contact plate 336 which has a through-hole 3361 and is connected to an electrode lead (not shown) of an electrode assembly, placed at the lowermost layer of the cap assembly.

Conductive safety vent unit 331 has a ring-shaped peripheral portion separated from the contact plate 336 by the insulating plate 337. The conductive safety vent unit 331, which is placed above the contact plate 336, also has a central portion formed downward convexly so that it is contact with the contact plate 336.

PTC 333 and a positive electrode cap 334 are mounted above conductive safety vent unit 331.

The cap lamination assembly may be integrally formed with a gasket 335, its peripheral portion of the cap lamination assembly being covered by the gasket when the gasket is formed through injection-molding.

Also, the cap lamination assembly and the gasket 335 are integrally inserted in the upper portion of a can and become part of the cylinder-type secondary battery through a crimping process.

In the gasket injection process, a portion of the gasket 335 is directed into a wedge-shaped through-hole 3363 formed in the contact plate 336 and solidified, thereby enhancing the physical assembling force between the gasket and the cap lamination assembly.

The through-hole 3363 may be formed such that the diameter of its upper part is the same as the diameter of its lower part. Alternatively, the through-hole 3363 may have a conical shape.

If heating in the interior of the secondary battery raises the interior pressure of the battery to an abnormal level, the pressure on the through-hole 3361 will push the downward convex portion of conductive safety vent unit 331 upward to cut off contact between the conductive safety vent and the contact plate 336. Thus electric current between an electrode lead (not shown) and the positive electrode cap 334 will be interrupted.

Additionally, PTC 333 works independently of conductive safety vent unit 331 to turn off the electric current between the electrode lead (not shown) and the positive electrode cap 334.

Figure 4:
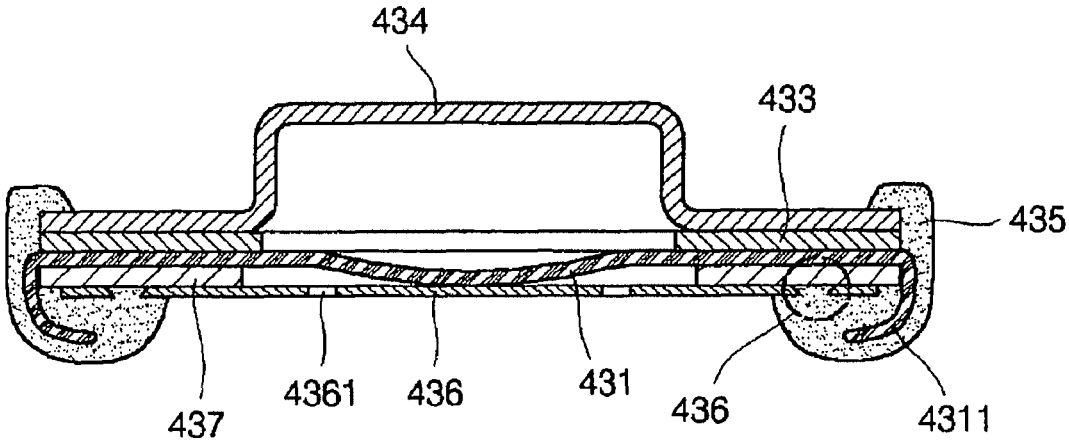
FIG. 4 is a sectional view of a cap assembly according to yet another embodiment of the invention.

FIG. 4 shows an exemplary embodiment of a cap assembly similar to the cap assembly shown in FIG. 3. However, the conductive safety vent unit [331] *431* has an extension part 4311 formed on a peripheral portion thereof, the extension part extending around a lower contact plate 436. The extension part 4311 may be deeply embedded in the interior part of an insulating gasket 435 in the exemplary embodiment of FIG. 4.

A hole 4363 for strengthening contact between a cap assembly and the insulating gasket 435 is formed in the peripheral portion of the contact plate 436.

If the extension part 4311 is bent inward, the extension part may form a groove together with the lower side of the peripheral portion of the contact plate 436, and the interior of the groove can be filled with the insulating gasket 435.

Figure 5:
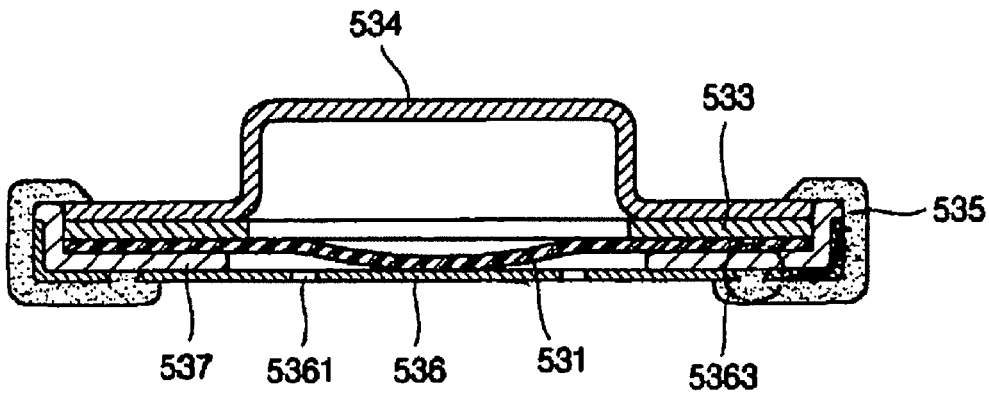
FIG. 5 is a sectional view of a cap assembly according to still another embodiment of the invention.

The exemplary embodiment of a cap lamination assembly as shown in FIG. 5 is similar to the exemplary embodiment of FIG. 3.

However, a peripheral portion of a contact plate 536 having a through-hole 5361 at the lowermost layer of a cap lamination assembly and being connected to an electrode lead (not shown) of an electrode assembly is bent upward. A peripheral portion of an insulating plate 537 above the contact plate 536 is also convexed upward.

Conductive safety vent unit 531, which has a peripheral portion not in contact with the contact plate 536, and a central portion formed convexly so as to contact the contact plate is placed above the insulating plate.

A positive electrode cap 534 are mounted above conductive safety vent unit 531, and a PTC 533 may be mounted there as well.

In this exemplary embodiment, the insulating plate 536, conductive safety vent unit 531, PTC 533, and the positive electrode cap 534 are placed in a fixed position above the contact plate 536 and the insulating plate 537 of the lowermost layer.

The cap lamination assembly is also integrally formed with a gasket 535, its peripheral portion being covered by the gasket when the gasket is formed through injection-molding as described above.

Also, the cap lamination assembly and the gasket 535 inserted in the upper portion of the can, and become part of the cylinder-type secondary battery through the crimping process.

Figure 6:
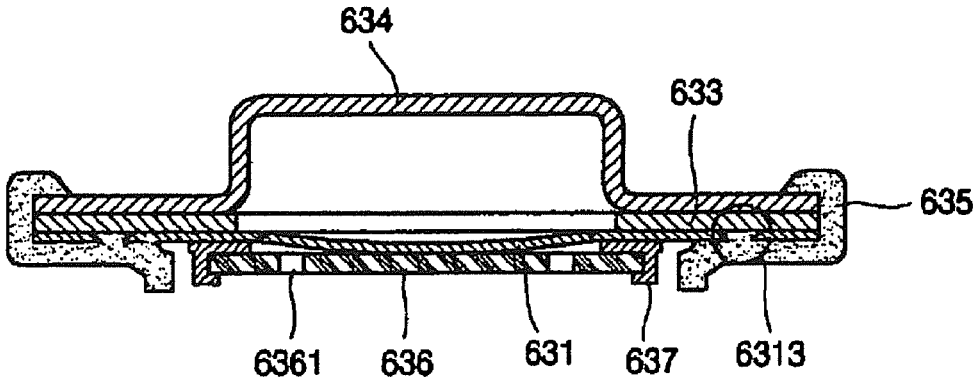
FIG. 6 is a sectional view of a cap assembly according to yet another embodiment of the invention.

The exemplary embodiment of FIG. 6 is also substantially similar to the cap assembly of FIG. 3.

However, a contact plate 636 and an insulating plate 637 are formed so as to correspond to and be attachable to the central portion of conductive safety vent unit 631. Thus, the thickness of the lamination assembly and the length of the secondary battery may be reduced.

Also, a peripheral portion of conductive safety vent unit 631 itself has holes 6313 for strengthening assembly with an insulating gasket 635. Additionally, the contact plate 636 has a hole 6361 allowing it to operate with conductive safety vent unit 631.

As a positive electrode cap 634, PTC 633, the contact plate 636, and conductive safety vent unit 631 having the insulating plate 637 are laminated and the gasket 635 is injected therein, a portion of the gasket becomes embedded in hole 6313 and solidifies. Thus, the lamination assembly becomes integrally formed with the insulating gasket 635.

An electrode lead (not shown) of an electrode assembly is welded to the contact plate 636, and the lamination assembly is inserted into the upper part of the cylinder-type cap through crimping to complete assembly of the secondary battery.

Figure 7:
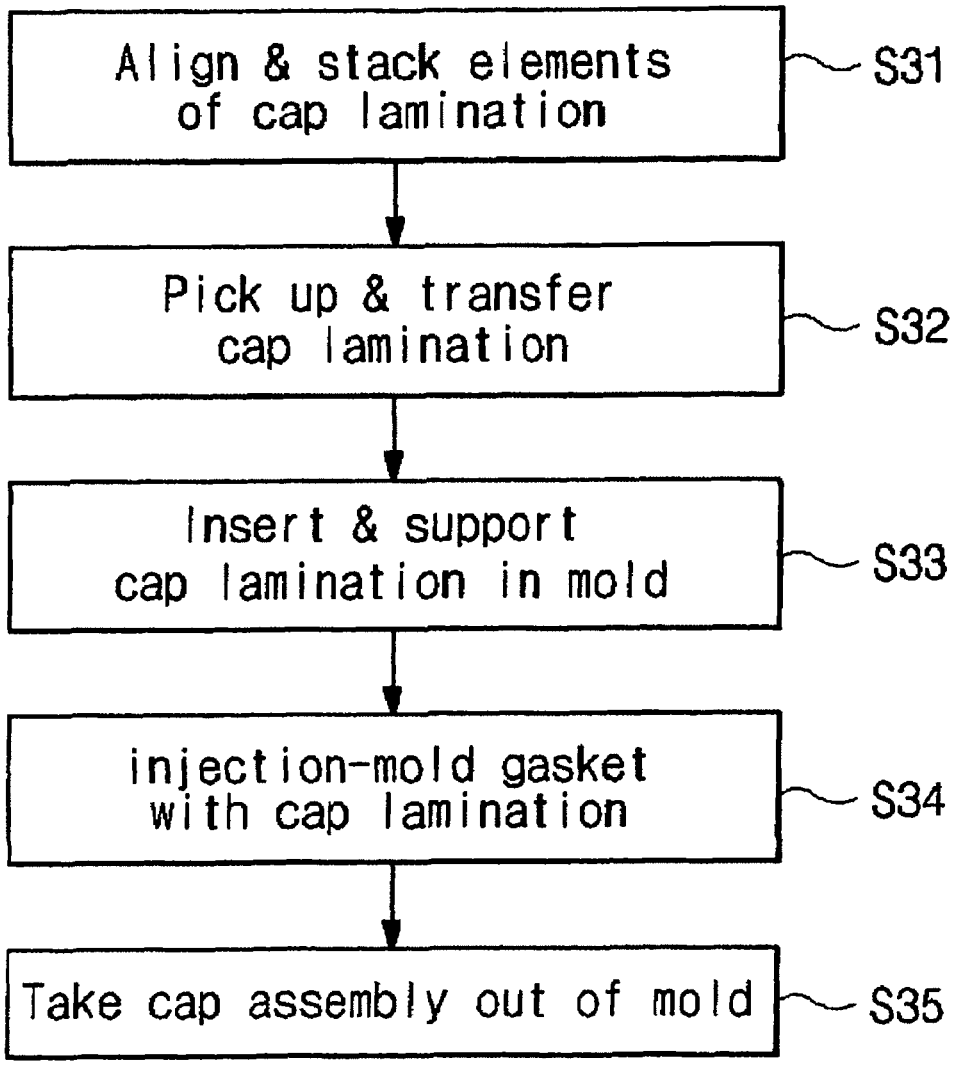
FIG. 7 is a flowchart showing a process for integrally molding a cap assembly according to an exemplary embodiment of the present invention.

FIG. 7 is a flowchart showing a process for integrally molding a cap assembly according to an exemplary embodiment of the present invention. As shown in FIG. 7, the method of injection-molding a cap assembly according to the present invention includes: aligning and stacking elements of a cap lamination on each other (S31); picking up and transferring the cap lamination (S32); inserting and supporting the cap lamination in a mold (S33); injecting a molding material, thereby injection-molding a gasket with the cap lamination (S34); and taking the cap assembly out of the mold (S35).

In the element aligning and stacking step (S31), conductive safety vent unit 231, printed circuit board 232, PTC element 233, and positive electrode cap 234, which constitute the cap lamination, are aligned and sequentially stacked one after another. Then, the aligned and stacked cap lamination is supported and held by a holder, such as a pneumatically-operated forced pin, etc. Here, the forced pin may have a shape of a dip and may be preferably from the same material as that of the gasket.

In the cap lamination pick up and transfer step (S32), the cap lamination having been supported and held by a forced pin, etc., is picked up and held by a dual pin, tweezers, etc., of an inserting jig and is then moved to the mold by a robot control operation.

In the cap lamination inserting and supporting step (S33), the cap lamination moved to the mold is inserted into the mold and is then held by a holding pin, etc., in order to perform injection-molding of the gasket. Here, the holding pin may be made from comparable material as that of the gasket.

In the injection-molding step (S34), the gasket is injection-molded in such a manner that edges of the gap lamination inserted and held in the mold are partially inserted in the gasket. Here, a hole or recess is formed at a lower element the cap lamination, and the molten gasket is inserted in the hole or recess during the injection-molding, thereby enhancing the assembling force between the cap lamination and the gasket. The gasket may be made from polymer resin, which is an insulating material, such as polypropylene, etc.

In the step of the cap assembly take-out step (S35), the cap assembly including the cap lamination and the gasket, which are integrally injection-molded, is taken out of the mold and is then dropped on an outputting conveyer.

As described above, the present invention provides an integrated cap assembly for a secondary battery, thereby highly increasing tightness between a cap lamination of the cap assembly, including conductive safety vent unit 131, printed circuit board 132, PTC element 133, and positive electrode cap 134, and an insulating gasket surrounding and clamping the cap lamination. Further, a process of forming a cap assembly of a secondary battery according to the present invention enables the secondary battery to be assembled by only one apparatus, thereby greatly reducing the number of necessary apparatuses, the manufacturing time, the manufacturing cost, etc., for the fabrication of the secondary battery, and thereby increasing productivity.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed:

1. An integrated cap assembly of a secondary battery, the integrated cap assembly comprising:

a cap lamination assembly having a safety vent, a contact plate connectable to an electrode lead of an electrode assembly in the secondary battery, and an insulating plate forming a connection between the safety vent and the contact plate at an electric connection portion; and a gasket formed integrally with the cap lamination assembly, a peripheral portion of at least one of the safety vent, the contact plate and the insulating plate of the cap lamination assembly being inserted in the gasket, the gasket insulating the cap lamination assembly from a can of the secondary battery and sealing a gap between the cap lamination assembly and the can, wherein a lowermost layer of the cap lamination assembly has a hole between an end and the center of the lowermost layer, and a portion of the gasket is inserted into the hole.

2. The integrated cap assembly of claim 1, wherein the cap lamination assembly further comprises a positive thermal coefficient element and an electrode cap.

3. The integrated cap assembly of claim 1, wherein the cap lamination assembly comprises an electrode cap, and wherein the electrode cap, the safety vent, the insulating plate, and the contact plate are layered from top down in the cap lamination assembly and are inserted in the gasket.

4. The integrated cap assembly of claim 3, wherein a peripheral portion of at least one of the electrode cap, the safety vent, the insulating plate, and the contact plate protrudes more deeply into the gasket as compared with others of the electrode cap, the safety vent, the insulating plate, and the contact plate.

5. The integrated cap assembly of claim 3, wherein the contact plate has a protruding portion along a contact plate peripheral defining positions of the electrode cap, the safety vent, and the insulating plate.

6. The integrated cap assembly of claim 1, wherein the cap lamination assembly comprises an electrode cap, the safety vent, the insulating plate, the contact plate, and the electrode cap, the safety vent, the insulating plate, and the contact plate are layered, and the electrode cap, the safety vent, and the insulating plate are inserted in the gasket, the insulating plate being attached both to the safety vent and the contact plate, sealing the space between the safety vent and the contact plate.

7. The integrated cap assembly of claim 1, wherein the cap lamination assembly and the gasket are integrated with each other through injection-molding.

8. The integrated cap assembly of claim 1, wherein the hole is formed at the contact plate.

9. The integrated cap assembly of claim 8, wherein the hole narrowingly tapers from a surface contacting the insulating plate.

10. The integrated cap assembly of claim 3, wherein the contact plate is bent upward at about 90 degrees.

11. The integrated cap assembly of claim 3, wherein the contact plate is bent downward at about 90 degrees.

12. The integrated cap assembly of claim 1, wherein the hole comprises an inlet portion and a rear portion, and the rear portion comprises a larger sectional area than that of the inlet portion in the direction filled by the gasket.

*13. An integrated cap assembly of a secondary battery, the integrated cap assembly comprising:*

*a cap lamination assembly having a safety vent, a contact plate connectable to an electrode lead of an electrode assembly in the secondary battery, and an insulating plate forming a connection between the safety vent and the contact plate at an electric connection portion; and*

*a gasket formed with the cap lamination assembly, a peripheral portion of at least one of the safety vent, the contact plate and the insulating plate of the cap lamination assembly being inserted in the gasket, the gasket insulating the cap lamination assembly from a can of the secondary battery and sealing a gap between the cap lamination assembly and the can, wherein a lowermost layer of the cap lamination assembly has a hole between an end and the center of the lowermost layer, and a portion of the gasket is inserted into the hole.*

*14. The integrated cap assembly of claim 13, wherein the cap lamination assembly has a groove, and wherein another portion of the gasket is inserted into the groove.*

*15. The integrated cap assembly of claim 13, wherein the lowermost layer of the cap lamination assembly is the contact plate or the safety vent.*

*16. The integrated cap assembly of claim 13, wherein the cap lamination assembly further comprises a positive electrode cap, and wherein the positive electrode cap is layered above the safety vent, the insulating plate, and the contact plate and is also inserted in the gasket.*

*17. A secondary battery comprising:*

*an electrode assembly comprising an electrode lead;*

*a can for receiving the electrode assembly;*

*an integrated cap assembly comprising:*

*a cap lamination assembly having a safety vent, a contact plate connectable to the electrode lead of the electrode assembly, and an insulating plate forming a connection between the safety vent and the contact plate at an electric connection portion; and*

*a gasket formed with the cap lamination assembly, a peripheral portion of at least one of the safety vent, the contact plate and the insulating plate of the cap lamination assembly being inserted in the gasket, the gasket insulating the cap lamination assembly from the can and sealing a gap between the cap lamination assembly and the can, wherein a lowermost layer of the cap lamination assembly has a hole between an end and the center of the lowermost layer, and a portion of the gasket is inserted into the hole.*

*18. The secondary battery of claim 17, wherein the electrode lead of the electrode assembly is a positive electrode lead.*

*19. The secondary battery of claim 17, wherein the lowermost layer of the cap lamination assembly is the contact plate or the safety vent.*

*20. The secondary battery of claim 17, wherein the cap lamination assembly has a groove, and wherein another portion of the gasket is inserted into the groove.*

* * * * *